US008306093B2

(12) United States Patent
Chen et al.

(10) Patent No.: US 8,306,093 B2
(45) Date of Patent: Nov. 6, 2012

(54) METHOD AND APPARATUS FOR MULTIPATH MITIGATION

(75) Inventors: Shiou-Hung Chen, San Diego, CA (US); Grant Alexander Marshall, Campbell, CA (US); Emilija M. Simic, La Jolla, CA (US); Douglas Neal Rowitch, Del Mar, CA (US); Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 12/326,001

(22) Filed: Dec. 1, 2008

(65) Prior Publication Data
US 2010/0135365 A1 Jun. 3, 2010

(51) Int. Cl.
*H04B 1/00* (2006.01)
(52) U.S. Cl. ........ 375/148; 375/147; 375/140; 375/316; 375/219; 375/295
(58) Field of Classification Search .................. 375/148, 375/147, 140, 316, 219, 295; 701/213, 207, 701/214, 215
See application file for complete search history.

(56) References Cited

U.S. PATENT DOCUMENTS
5,692,008 A 11/1997 Van Nee

FOREIGN PATENT DOCUMENTS
EP 1288672 A1 3/2003

OTHER PUBLICATIONS

Soubielle et al., "GPS Positioning in a Multipath Environment," IEEE Transactions on Signal Processing, vol. 50, No. 1, Jan. 2002.
International Search Report & Written Opinion—PCT/US2009/063979—International Search Authority—European Patent Office—May 25, 2010.
Partial International Search Report—PCT/US2009/063979, International Searching Authority—European Patent Office—Mar. 18, 2010.
Sahmoudi M et al: "Fast Iterative Maximum-Likelihood Algorithm (FIMLA) for Multipath Mitigation in the Next Generation of GNSS Receivers" IEEE Transactions on Wireless Communications, IEEE Service Center, Piscataway, NJ, US, vol. 7, No. 11, Nov. 1, 2008, pp. 4362-4374, XP011238636 ISSN: 1536-1276.
Sahmoudi M et al: "Improved Maximum-Likelihood Time Delay Estimation for GPS Positioning in Multipath, Interference and Low SNR Environments" Position, Location, and Navigation Symposium, 2006 IEEE/ION Coronado, CA Apr. 25-27, 2006, Piscataway, NJ, USA,IEEE, Apr. 25, 2006, pp. 876-882, XP010925013 ISBN: 978-0-7803-9454-4 sections I I , IV.

*Primary Examiner* — Zewdu Kassa
(74) *Attorney, Agent, or Firm* — Linda G. Gunderson

(57) ABSTRACT

An apparatus and method for short multipath mitigation. In one aspect the method comprises subtracting a first stronger path from a correlation function to obtain a first residual signal, wherein one component of the first residual signal is a weaker path; applying reconstruction on the first residual signal to obtain a first reconstructed weaker path; subtracting the first reconstructed weaker path from the correlation function to obtain a second residual signal; and applying reconstruction on the second residual signal to obtain a second stronger path. In one aspect, the apparatus includes an antenna for receiving a composite receive RF signal, a receiver front-end for converting the composite receive RF signal into a composite receive digital signal; and a processor for performing signal correlation on the composite receive digital signal to obtain a correlation function and for processing the correlation function to obtain a desired signal. In one aspect, the short multipath is identified by computing a Left Edge Height Ratio Indicator (LEHRI).

37 Claims, 12 Drawing Sheets

METHOD AND APPARATUS FOR MULTIPATH MITIGATION

FIELD

This disclosure relates generally to apparatus and methods for multipath mitigation.

BACKGROUND

Global Navigation Satellite System (GNSS) receivers determine position by computing the relative time of arrival (TOA) of ranging signals that are continually transmitted from a plurality of GNSS satellites orbiting the earth and/or pseudolites (collectively referred to herein as "GNSS sources"). GNSS sources transmit satellite information such as timing and ephemeris data in addition to ranging signals. As described herein, GNSS sources can include the United States Global Positioning System (GPS), the Russian Glonass system, the European Galileo system, any system that uses satellites from a combination of satellite systems, or any satellite system developed in the future (collectively called as "SPS" or "Satellite Positioning System"). Furthermore, some position determination systems utilize pseudolites or a combination of satellites and pseudolites. Pseudolites are ground-based transmitters that broadcast a ranging code, such as a PN code (similar to a GPS or CDMA cellular signal), modulated on a carrier signal which may be synchronized with time provided by an SPS. Pseudolites are useful in situations where SPS signals from an orbiting satellite might be unavailable, such as in tunnels, mines, buildings, urban canyons or other enclosed areas. The term "satellite", as used herein, is intended to include pseudolites, equivalents of pseudolites, and possibly others. The term "SPS signals," as used herein, is intended to include SPS-like signals from pseudolites or equivalents of pseudolites. Additionally, other non-GNSS sources, such as one that is used for the Advanced Forward. Link Trilateration (AFLT) technique, may be used. Herein, GNSS sources and non-GNSS sources are collectively referred to as ranging sources.

Ranging Receivers often use omni-directional antennas to capture signals from all sources in view. Each channel of the ranging receiver is designed to be selective for a particular desired signal. The lack of spatial discrimination inherent in omni-directional antennas makes the ranging receiver susceptible to receiving multiple, delayed copies of the same desired signal, which causes corruption of the received signal. This type of signal corruption is known as multipath interference. In particular, multipath interference may cause errors in position determination or timing by the ranging receiver. Such multipath errors can also be experienced when using more traditional, optimized antennas with upward facing gain patterns.

Multipath interference is generally composed of a superposition of multiple copies of the same signal (e.g., the line of sight (LOS) signal and one or more reflected copies of the LOS signal, or an earliest reflected signal with one or more later delayed signals). In general, both LOS and reflected signals are part of the received composite signal. The delayed copies may comprise signal copies separated by various time delays. Time delay in CDMA systems is typically measured in units of chips, where one chip is the time duration of pseudonoise (PN) code elements (about a microsecond for the GPS course acquisition or C/A code).

Ranging receivers typically discriminate among multiple spread spectrum signals in the received composite signal through correlation processing. In correlation processing, the received composite signal is correlated with a reference signal matched to the desired signal to obtain a correlation function. Ideally, there is one distinguishable peak in the correlation function which indicates the presence and time delay of the desired signal. However, in the presence of multipath interference, there will be several multipath components with different peaks in the correlation function.

A typical ranging receiver can distinguish multipath components separated by some predetermined quantity of chips. For some systems, it can distinguish multipath components separated by at least 1.5 chips. Current multipath mitigation algorithms do not work well for short multipath scenarios. For example, some multipath mitigation algorithms do not work well where the short multipath components are typically separated by less than 1.5 chips. In addition, other algorithms used for multipath mitigation may have excessive computational burden.

SUMMARY

Disclosed is an apparatus and method for multipath mitigation. According to one aspect, a method for multipath mitigation comprising subtracting a first stronger path from a correlation function to obtain a first residual signal, wherein one component of the first residual signal is a weaker path; applying reconstruction on the first residual signal to obtain a first reconstructed weaker path; subtracting the first reconstructed weaker path from the correlation function to obtain a second residual signal; and applying reconstruction on the second residual signal to obtain a second stronger path.

According to another aspect, a method for multipath mitigation comprising obtaining a shape of a local maximum of a correlation function; computing a Left Edge Height Ratio Indicator (LEHRI) of the shape of the local maximum; comparing the LEHRI to a LEHRI threshold ($T_{LEHRI}$) to determine if a weaker path is detected; subtracting a first stronger path from the correlation function to obtain a first residual signal, wherein one component of the first residual signal is the weaker path; locating a valid peak of the first residual signal; applying reconstruction on the valid peak of the first residual signal to obtain a first reconstructed weaker path; subtracting the first reconstructed weaker path from the correlation function to obtain a second residual signal; and applying reconstruction on the second residual signal to obtain a second stronger path.

According to another aspect, an apparatus comprising a processor and a memory, the memory containing program code executable by the processor for performing the following: subtracting a first stronger path from a correlation function to obtain a first residual signal, wherein one component of the first residual signal is a weaker path; applying reconstruction on the first residual signal to obtain a first reconstructed weaker path; subtracting the first reconstructed weaker path from the correlation function to obtain a second residual signal; and applying reconstruction on the second residual signal to obtain a second stronger path.

According to another aspect, an apparatus comprising a processor and a memory, the memory containing program code executable by the processor for performing the following: obtaining a shape of a local maximum of a correlation function; computing a Left Edge Height Ratio Indicator (LEHRI) of the shape of the local maximum; comparing the LEHRI to a LEHRI threshold ($T_{LEHRI}$) to determine if a weaker path is detected; subtracting a first stronger path from the correlation function to obtain a first residual signal, wherein one component of the first residual signal is the weaker path; locating a valid peak of the first residual signal;

applying reconstruction on the valid peak of the first residual signal to obtain a first reconstructed weaker path; subtracting the first reconstructed weaker path from the correlation function to obtain a second residual signal; and applying reconstruction on the second residual signal to obtain a second stronger path.

According to another aspect, a receiver comprises an antenna for receiving a composite receive RF signal from a plurality of sources; a receiver front-end for converting the composite receive RF signal into a composite receive digital signal; and a processor for performing signal correlation on the composite receive digital signal to obtain a correlation function, wherein the processor is coupled to a memory containing program code executable by the processor for performing the following: subtracting a first stronger path from a correlation function to obtain a first residual signal, wherein one component of the first residual signal is a weaker path; applying reconstruction on the first residual signal to obtain a first reconstructed weaker path; subtracting the first reconstructed weaker path from the correlation function to obtain a second residual signal; and applying reconstruction on the second residual signal to obtain a second stronger path.

According to another aspect, a computer-readable medium including program code stored thereon, comprising program code for obtaining a shape of a local maximum of a correlation function; program code for subtracting a first stronger path from the correlation function to obtain a first residual signal, wherein one component of the first residual signal is a weaker path; program code for applying reconstruction on the first residual signal to obtain a first reconstructed weaker path; program code for subtracting the first reconstructed weaker path from the correlation function to obtain a second residual signal; and program code for applying reconstruction on the second residual signal to obtain a second stronger path.

According to another aspect, a computer-readable medium including program code stored thereon, comprising program code for obtaining a shape of a local maximum of a correlation function; program code for computing a Left Edge Height Ratio Indicator (LEHRI) of the shape of the local maximum; program code for comparing the LEHRI to a LEHRI threshold ($T_{LEHRI}$) to determine if a weaker path is detected; program code for subtracting a first stronger path from the correlation function to obtain a first residual signal, wherein one component of the first residual signal is the weaker path; program code for locating a valid peak of the first residual signal; program code for applying reconstruction on the valid peak of the first residual signal to obtain a first reconstructed weaker path; program code for subtracting the first reconstructed weaker path from the correlation function to obtain a second residual signal; and program code for applying reconstruction on the second residual signal to obtain a second stronger path.

According to one aspect, a method for multipath identification comprises obtaining a shape of a local maximum of a correlation function; computing a Left Edge Height Ratio Indicator (LEHRI) of the shape of the local maximum; and comparing the LEHRI to a LEHRI threshold ($T_{LEHRI}$) to determine if the weaker path is detected.

According to one aspect, an apparatus comprising a processor and a memory, the memory containing program code executable by the processor for performing the following: program code for obtaining a shape of a local maximum of a correlation function; program code for computing a Left Edge Height Ratio Indicator (LEHRI) of the shape of the local maximum; and program code for comparing the LEHRI to a LEHRI threshold ($T_{LEHRI}$) to determine if the weaker path is detected.

According to one aspect, a computer-readable medium including program code stored thereon, comprising program code for obtaining a shape of a local maximum of a correlation function; program code for computing a Left Edge Height Ratio Indicator (LEHRI) of the shape of the local maximum; and program code for comparing the LEHRI to a LEHRI threshold ($T_{LEHRI}$) to determine if a weaker path is detected.

In general, in another aspect, method of processing positioning signals comprises receiving a positioning signal and correlating the received positioning signal with a generated reference signal to generate correlated positioning information having a peak. The correlated positioning information includes a first correlation result and a second correlation result on the same side of the peak of the correlated positioning information. A relationship between the first correlation result and the second correlation result is determined, and it is determined whether short multipath comprising a weaker early signal and at least one stronger later signal in the positioning signal is indicated based on the relationship between the first correlation result and the second correlation result. If short multipath is indicated, the correlated positioning information is processed to remove the effect of at least some of the correlated positioning information corresponding to the at least one stronger later signal. A ranging result may be generated based on the processing the correlated positioning information. The ranging result may be one or more pseudoranges, locations, or other information using distance information between a positioning source (such as a satellite) and receiver.

In some aspects, the ranging signal may be corrected using the relationship between the first correlation result and the second correlation result. The relationship between the first correlation result and the second correlation result may include a ratio of the first correlation result to the second correlation result, a left likelihood function, or other relationship. The ranging signal may be corrected using the ratio of the first correlation result and the second correlation result times a proportionality constant.

In general, in another aspect, the effect of at least some of the correlated positioning information corresponding to the at least one stronger later signal can be mitigated by generating an estimate of a contribution to the correlated positioning information from the at least one stronger later signal, subtracting the estimate from the correlated positioning information to generate a first residual, and using the first residual to generate a first reconstructed estimation of a contribution of the weaker early signal to the correlated positioning result. This process may be iterated to improve the estimate.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
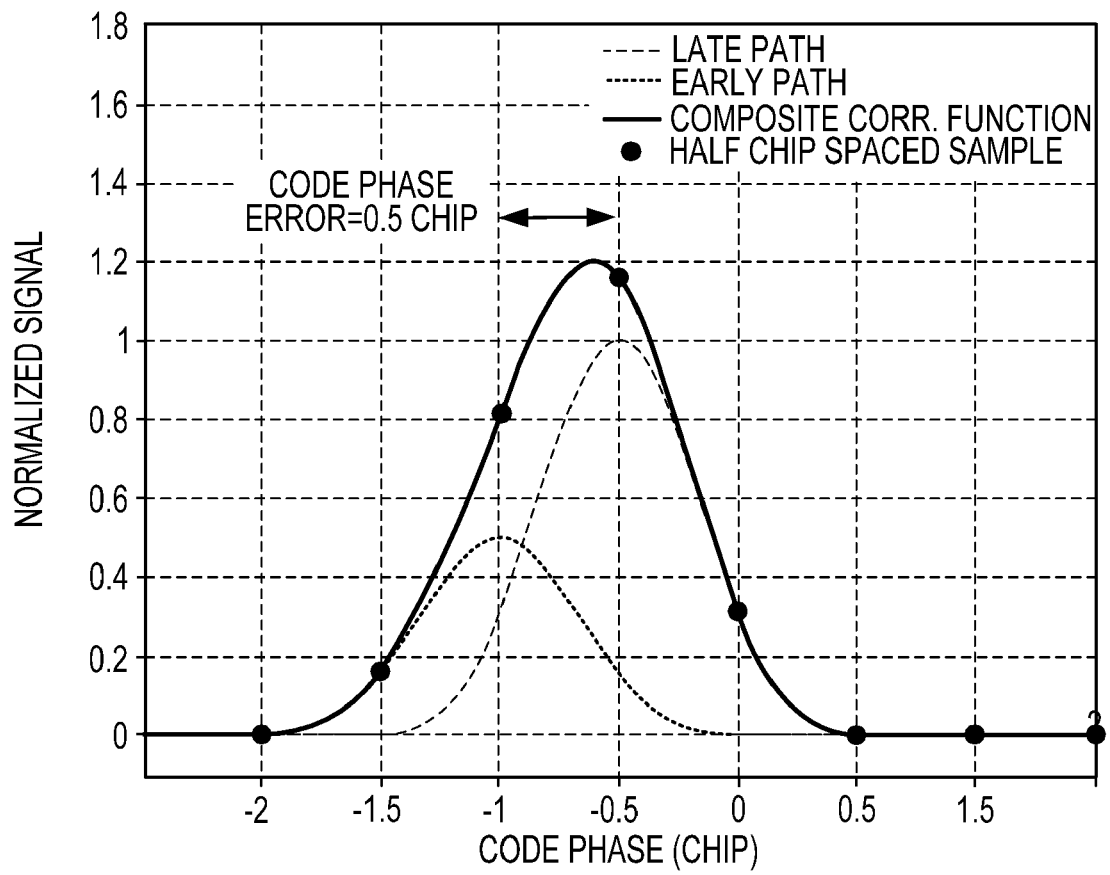
FIG. 1 illustrates an example with a short multipath component in the correlation function.

FIG. 1 illustrates an example with a short multipath component in the correlation function. In this example illustrated in FIG. 1, the local maximum of the correlation function is centered at t=−0.1 chip and the short multipath component, which is at the line of sight (LOS), is centered at t=−1 chip.

Figure 2:
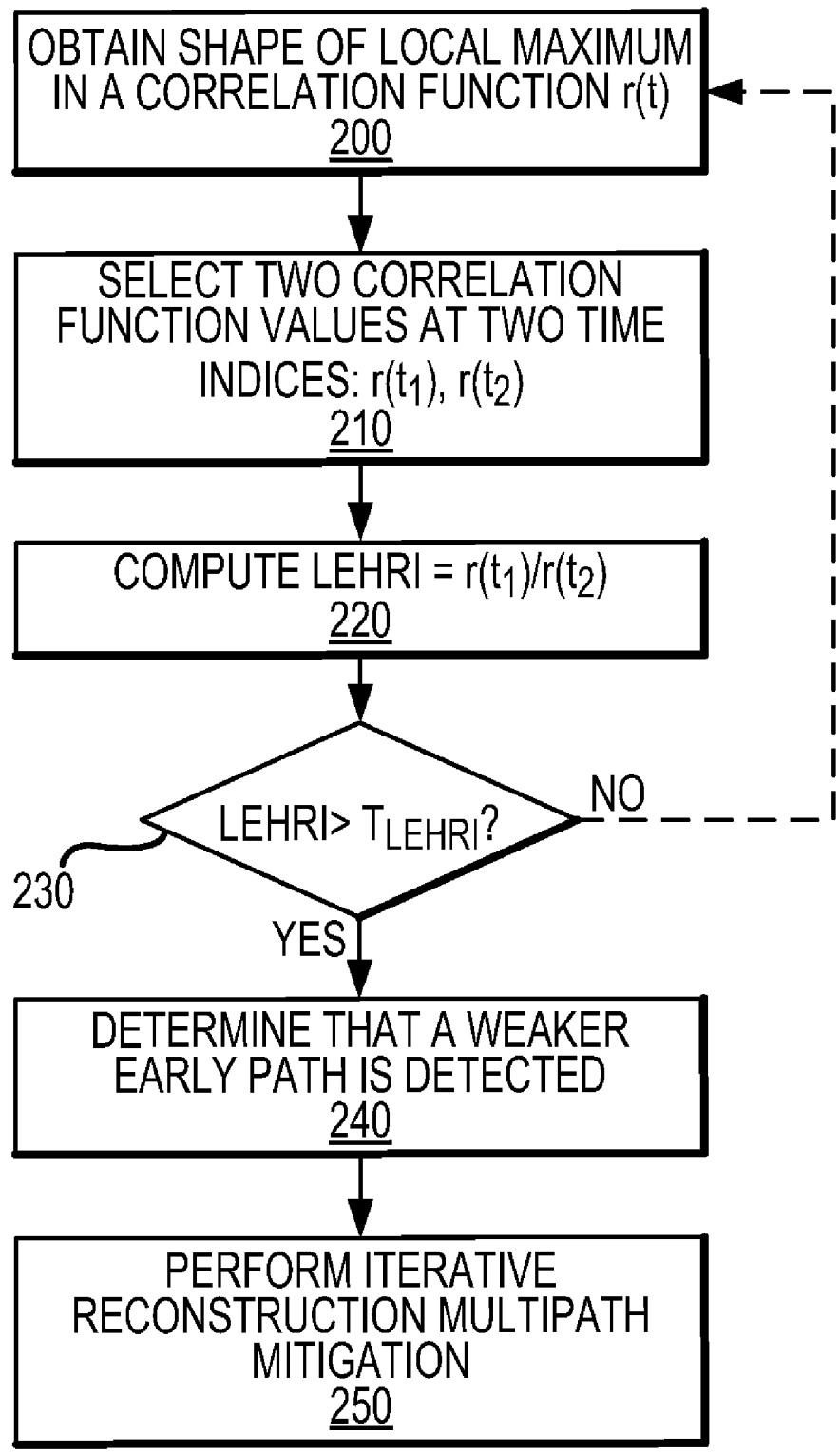
FIG. 2 illustrates a short multipath detection algorithm.

FIG. 2 illustrates a short multipath detection algorithm to detect a possible short multipath component in the correlation function, where time is set to zero at the maximum of the correlation function for simplicity. The correlation function is denoted as r(t), where time t is expressed in units of chips, and time t=0 denotes the peak position of the correlation function r(t). In block 200, obtain the shape of the local maximum in a correlation function r(t). In block 210, select two correlation function values at two time indices, $r(t_1)$ and $r(t_2)$, wherein $t_1$ is always less than $t_2$, and both $t_1$ and $t_2$ are less than zero (the rising edge of the pulse) and within one chip of the correlation function peak r(0) (i.e., within the peak as bounded by regions where the correlation function is substantially flat). In one example, $t_1$ is set to −0.8 chips and $t_2$ is set to −0.2 chips.

Following block 210, in block 220, compute the Left Edge Height Ratio Indicator (LEHRI) by forming the ratio of $r(t_1)$ over $r(t_2)$. Herein, the phrase "left edge" is used to refer to the portion of a correlation result on the side of a maximum of the correlation result corresponding to an earlier received signal in a multipath scenario (the leading edge, corresponding to the earlier code phase side of the correlation result). Use of the term "left" does not imply that a graph with left and right sides actually be generated, and also embraces the situation where data is graphed differently (e.g., switching positive and negative values of an x-axis so that the earlier received signal corresponds to the right side of the peak, switching the axes for code phase and correlation so that the peak is rotated 90 degrees, or other variation in data presentation).

In one aspect, LEHRI is computed by selecting two correlation values at two time indices on the left edge of the shape of the local maximum in the correlation function (i.e., $r(t_1)$ and $r(t_2)$), and by setting the LEHRI as the ratio of these two correlation values (i.e., LEHRI=$r(t_1)/r(t_2)$). In block 230, compare the LEHRI to a LEHRI threshold ($T_{LEHRI}$) to determine if the LEHRI exceeds $T_{LEHRI}$. In one example, the LEHRI threshold ($T_{LEHRI}$) is equal to 0.2. One skilled in the art would understand that the value of $T_{LEHRI}$ may be set based on system parameters, particular application and/or operator choice without affecting the spirit or scope of the present disclosure.

If LEHRI exceeds $T_{LEHRI}$, then a weaker path has been detected in block 240. Following block 240, an iterative reconstruction multipath mitigation algorithm is invoked in block 250. If LEHRI does not exceed $T_{LEHRI}$ as determined in block 230, then no weaker path has been detected. In one example, the process returns back to block 200 to obtain another correlation function.

Figure 3:
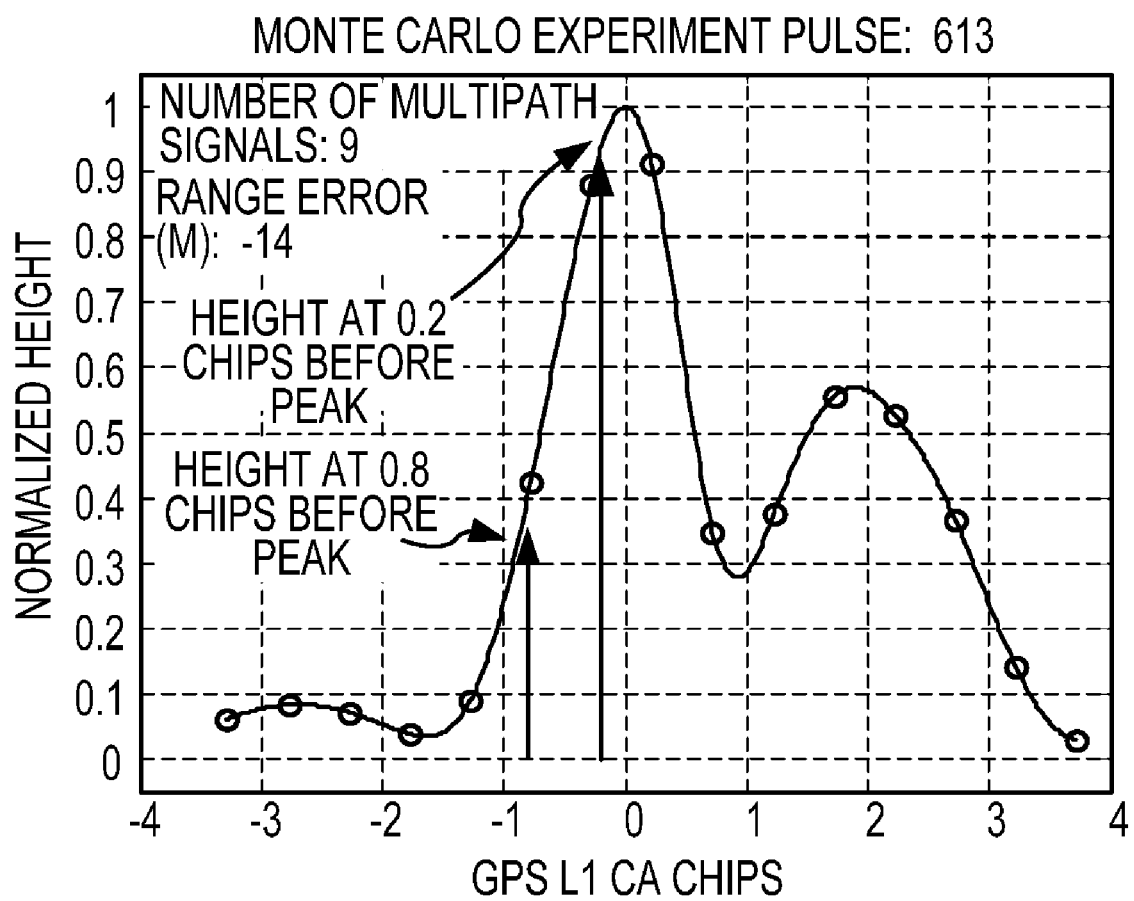
FIG. 3 illustrates the definition of LEHRI for the particular case of $t_1=-0.8$ and $t_2=-0.2$.
Figure 4:
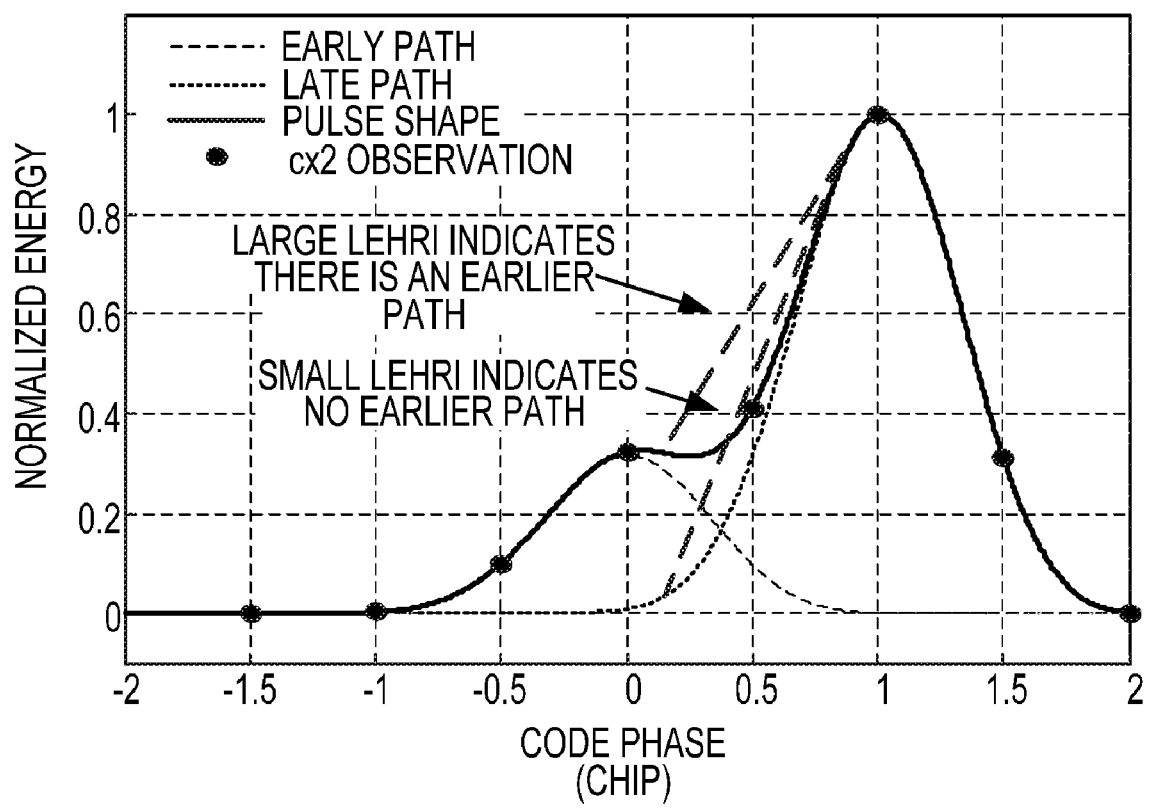
FIG. 4 illustrates how the LEHRI detects the presence of a weaker path.

FIG. 3 illustrates the definition of LEHRI for the particular case of $t_1$=−0.8 chips and $t_2$=−0.2 chips. The LEHRI is computed by taking the ratio of the correlation function r(t) at these two time indices. FIG. 4 illustrates how the LEHRI detects the presence of a weaker path. For example, a large value of LEHRI, compared to a LEHRI threshold ($T_{LEHRI}$) indicates the presence of a weaker path earlier than the stronger path. For example, a small value of LEHRI, compared to a LEHRI threshold ($T_{LEHRI}$) indicates the absence of a weaker path earlier than the stronger path. As FIG. 4 illustrates, the presence of the earlier, weaker path effectively reduces the slope on the left side of the correlation function (corresponding to a larger value of LEHRI), compared to the shape of the correlation function in the absence of the earlier weaker path (which corresponds to a smaller value of LEHRI). In effect, the signal with the shorter path (which may be the LOS signal) is buried in the composite peak.

Figure 5:
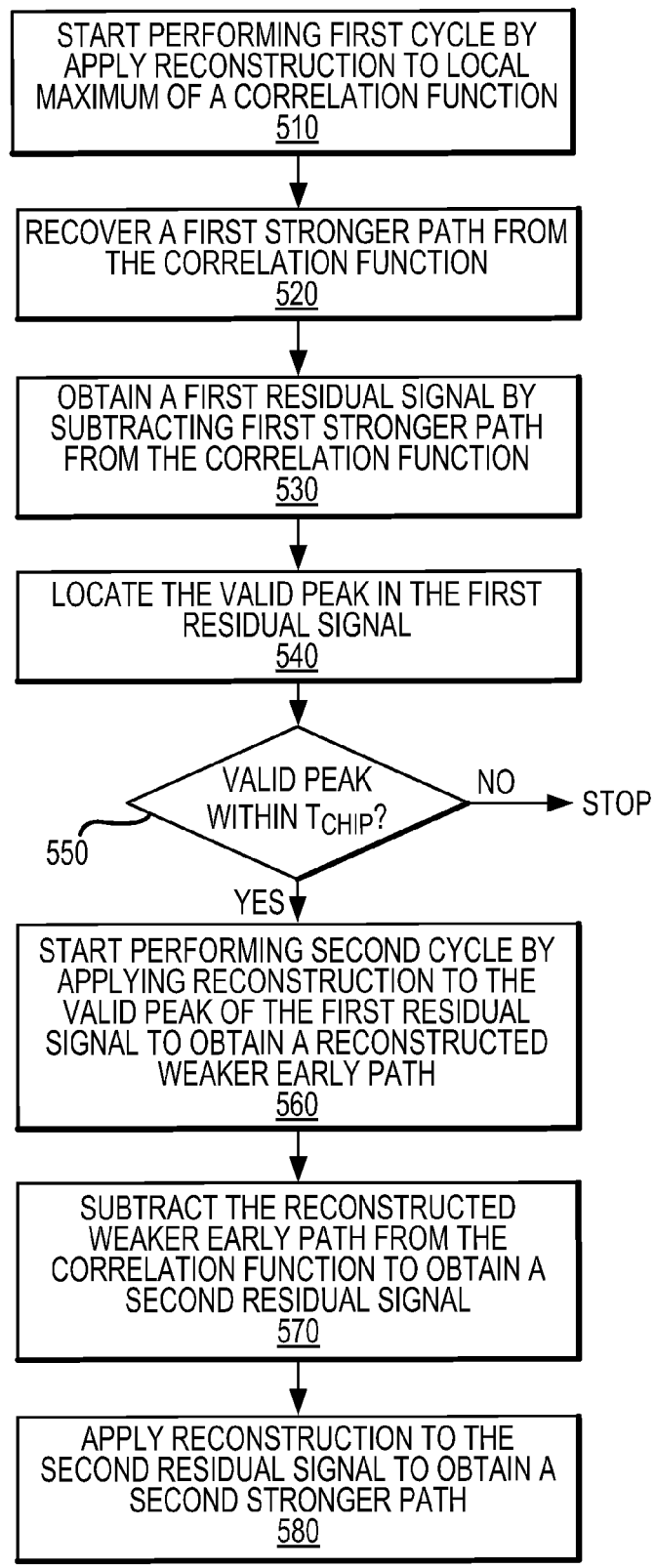
FIG. 5 illustrates an iterative reconstruction multipath mitigation algorithm.

FIG. 5 illustrates an iterative reconstruction multipath mitigation algorithm. Reconstruction refers to curve fitting of the correlation function r(t) based on discrete samples $r(t_k)$. In the example outlined here, the shape of the correlation function in the region of the peak is determined and used to construct a first estimate of the stronger, later peak. This estimate is then subtracted from the correlation function as a whole, leaving an initial estimate of the weaker, earlier peak. Reconstruction may then be performed in the weaker, earlier peak (to improve the estimate), and the reconstructed weaker, earlier path can then be subtracted from the correlation function to obtain an improved estimate of the stronger, later peak. This method can be performed iteratively, to sufficiently characterize the multiple signal components so that the desired signal can be obtained from the composite signal. The following is a more detailed example of a process for multipath mitigation.

At block 510, start performing a first cycle by applying reconstruction to the local maximum of the correlation function r(t). In block 520, a first stronger path is recovered from the correlation function r(t) from applying reconstruction to the local maximum of the correlation function r(t). In one example, a half chip spaced iterative reconstruction multipath mitigation algorithm is applied to the local maximum by performing a three point curve fit around the local maximum with higher sampling resolution, for example with 100:1 oversampling of the correlation function r(t). One skilled in the art would understand that the three point curve fit is one example, and that other curve fitting routines (e.g., 4 point curve fit, 5 point curve fit, etc.) could be used without changing the spirit or scope of the disclosure. Following block 520, subtract the first stronger path from the correlation function r(t) to obtain a first residual signal in block 530. In one aspect, the first residual signal is the weaker path. In block 540, locate the valid peak in the first residual signal and proceed to block 550. In one example, a valid peak is found if the signal-to-noise ratio is greater than a predetermined C/No threshold ($T_{C/No}$). One skilled in the art would understand that the $T_{C/No}$ may be chosen based on system parameters, design characteristics and/or operator choice without affecting the spirit and scope of the present disclosure.

In block 550, determine if the valid peak of the first residual signal is within a predetermined quantity of chips ($T_{chip}$) from the location of the local maximum of the correlation function r(t). One skilled in the art would understand that the $T_{chip}$ may be chosen based on system parameters, design characteristics and/or operator choice without affecting the spirit and scope of the present disclosure. In one example, $T_{chip}$ is set at 1.5 chips. If the valid peak of the first residual signal is not within $T_{chip}$, stop and take no further mitigation steps. If the valid peak of the first residual signal is within $T_{chip}$, proceed to block 560. In block 560, start performing a second cycle by applying reconstruction to the valid peak of the first residual signal to obtain the reconstructed weaker path. In one aspect, the reconstructed weaker path is the reconstructed first residual signal. In one example, the half chip spaced iterative reconstruction multipath mitigation algorithm is applied In block 570, subtract the reconstructed weaker path from the correlation function r(t) to obtain a second residual signal and then proceed to block 580. In block 580, apply reconstruction to the second residual signal (i.e., the difference of the correlation function r(t) and the reconstructed weaker path) to obtain a second stronger path. In one example, a half chip spaced iterative reconstruction multipath mitigation algorithm is applied. In one aspect, the second stronger path is the desired signal. In another aspect, the reconstructed weaker path is the desired signal. One skilled in the art would understand that the iterative reconstruction multipath mitigation algorithm illustrated in FIG. 5 could be applied to any correlation function with a short multipath component from ranging sources. As examples, ranging sources may include but are not limited to, GNSS sources, CDMA wireless systems, spread spectrum systems that use PN codes, etc.

In one aspect, further iterations are performed. For example, blocks 530 through 580 are repeated with the second stronger path (which was determined earlier in block 580) as a starting point in block 530. That is, substitute the second stronger path (which was determined earlier in block 580) for the first stronger path in block 530 to eventually determine a third stronger path once block 580 is performed again. For example, subtract the second stronger path from the correlation function to obtain a third residual signal, wherein one component of the third residual signal is the weaker path; perform reconstruction on the third residual signal to obtain a second reconstructed weaker path; subtract the second reconstructed weaker path from the correlation function to obtain a fourth residual signal; and perform reconstruction on the fourth residual signal to obtain a third stronger path. In one aspect, the third stronger path is the desired signal. In another aspect, the second reconstructed weaker path is the desired signal. One skilled in the art would understand that further iterations could be performed without affecting the spirit or scope of the present disclosure. In one aspect, an algorithm is performed to select a desired signal from either a weaker path or a stronger path. In this example, if the weaker path is more than 0.7 chips earlier and is within 6 dB relative to the stronger path, then report the weaker path as the desired signal. Otherwise, the stronger path is reported as the desired signal.

Figure 6:
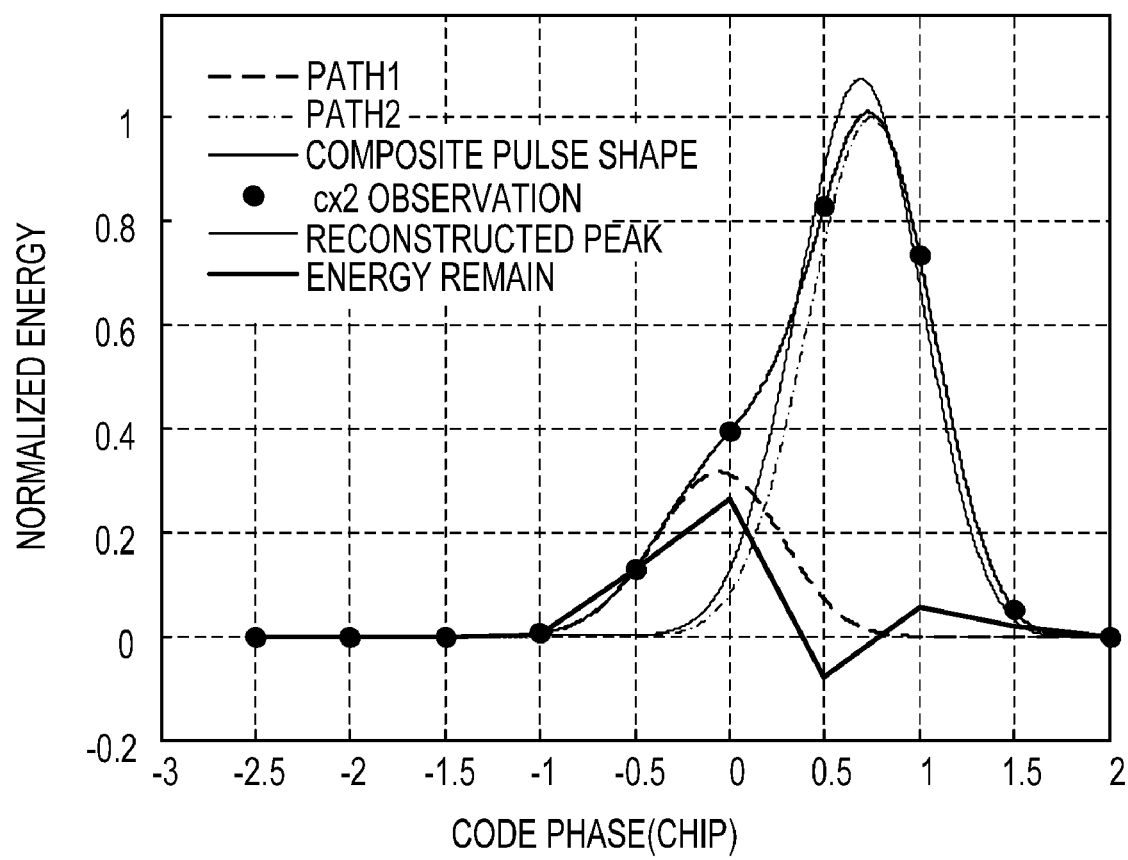
FIGS. 6 and 7 illustrate an example of a first iteration of the iterative reconstruction multipath mitigation algorithm.
Figure 7:
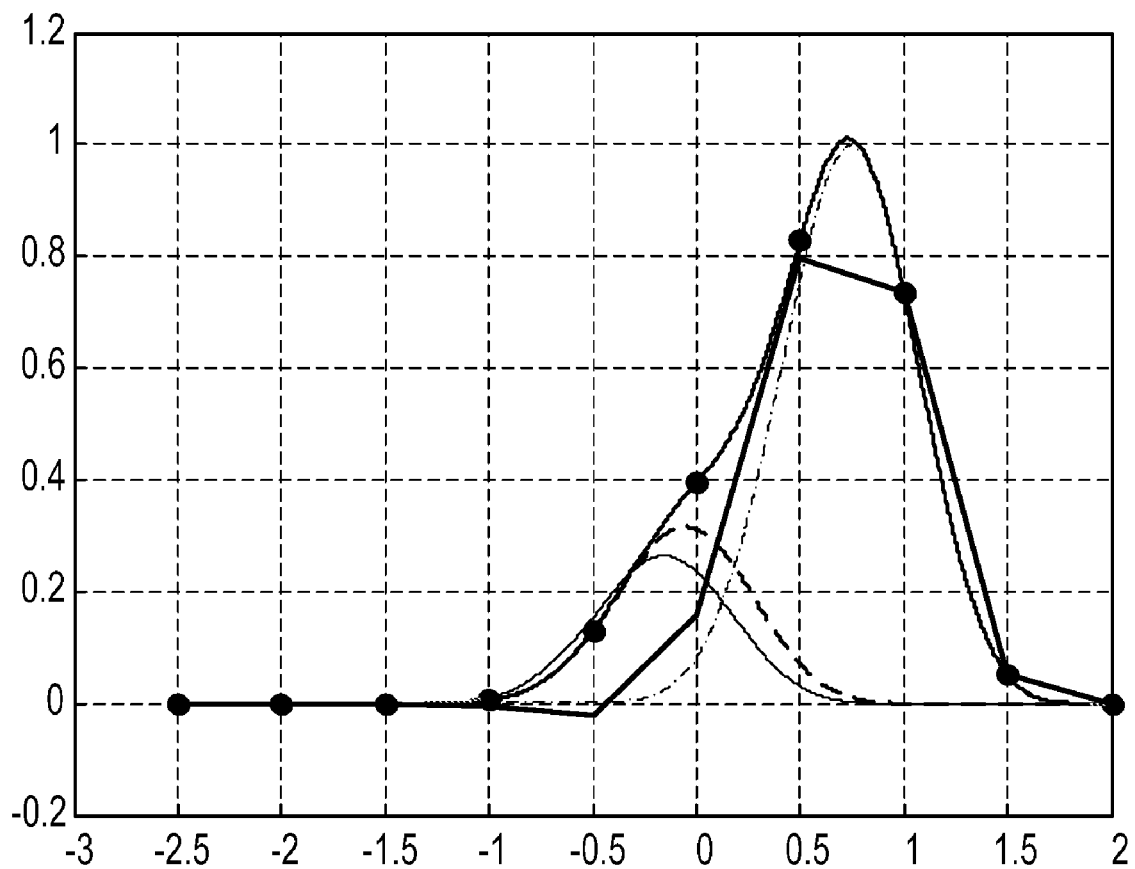
Figure 8:
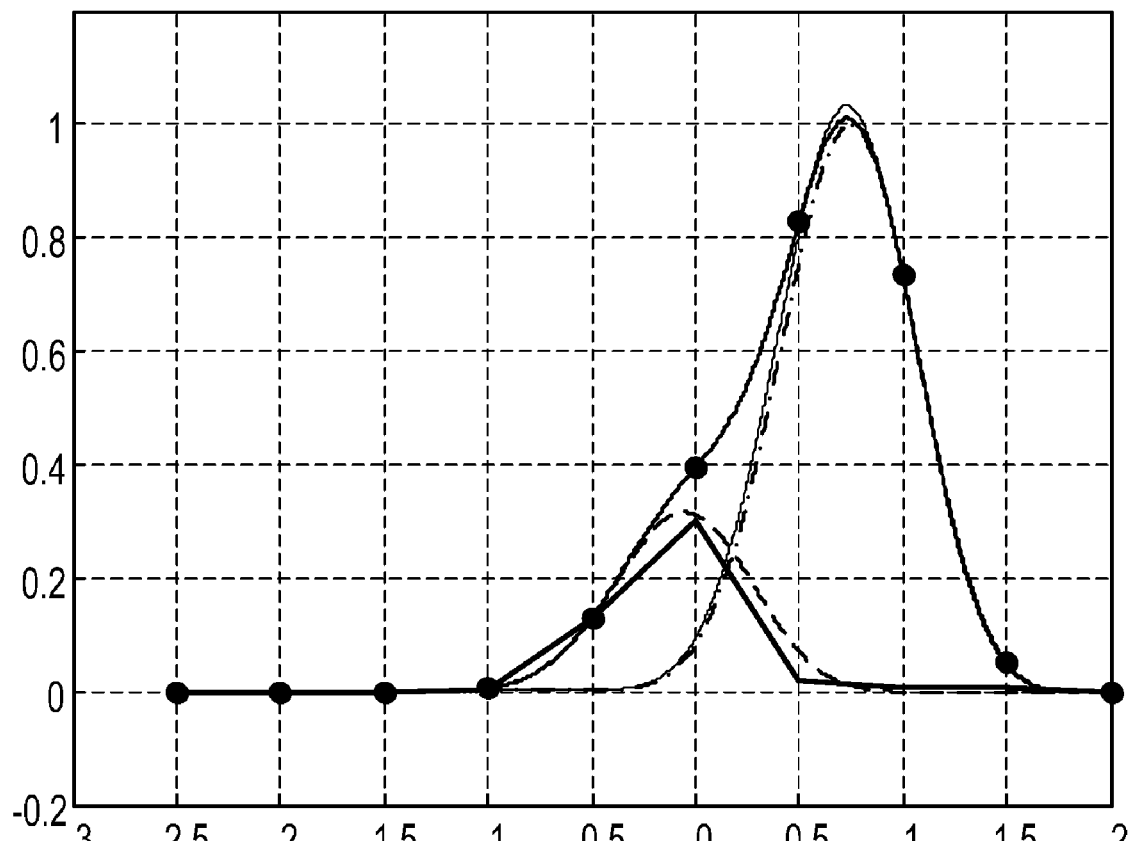
FIGS. 8 and 9 illustrate an example of a second iteration of the iterative reconstruction multipath mitigation algorithm.
Figure 9:
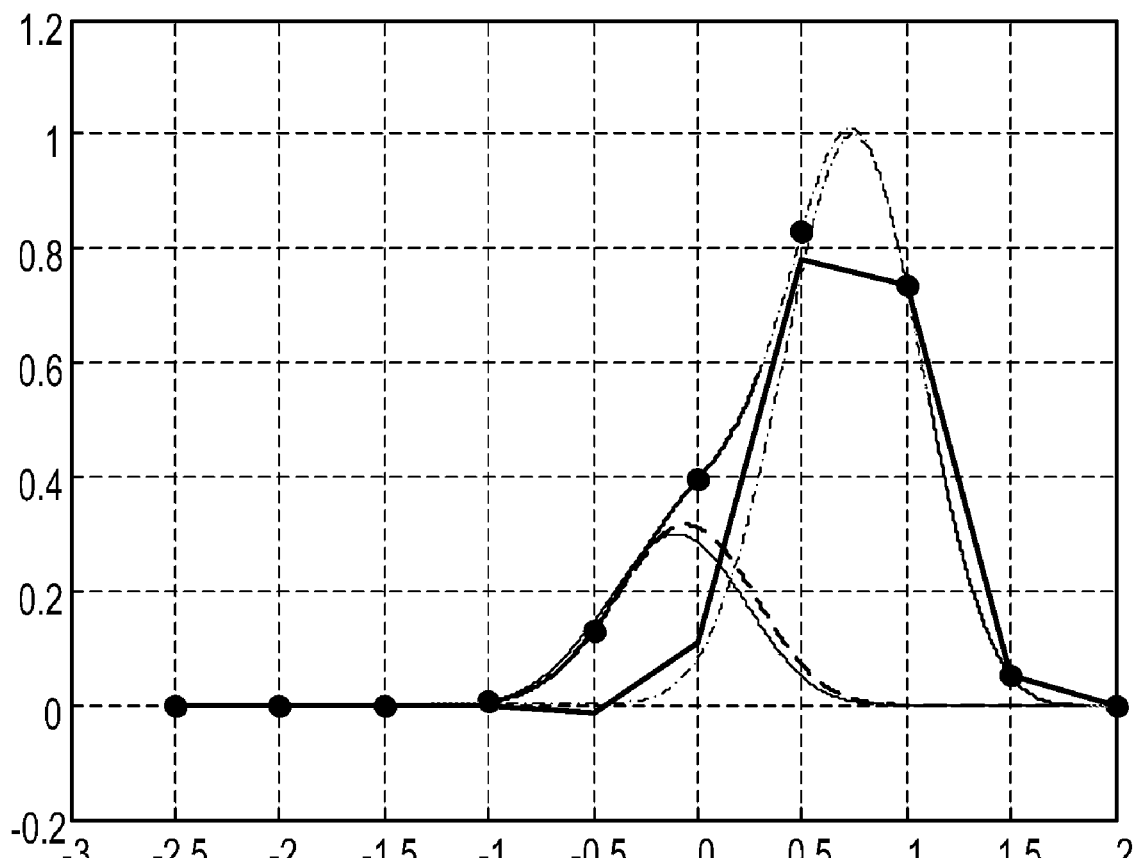

FIGS. 6 and 7 illustrate an example of a first iteration of the iterative reconstruction multipath mitigation algorithm. A weaker path is illustrated around t=0 chip and a stronger path is illustrated around t=0.7 chips. In FIG. 6, path 1 is the earlier weaker path, path 2 is the stronger later path (the two signals to be resolved from the composite signal), and the composite pulse shape is the shape of the correlation function based on the data points. The reconstructed peak is the first estimate of the stronger path, and the first residual ("Energy Remain") is the residual obtained by subtracting the reconstructed peak from the composite pulse. FIG. 7 shows that the improved estimate of the weaker path by reconstruction of the first residual, and also illustrates the second residual, which is obtained by subtraction of the reconstructed weaker path from the composite pulse. The second residual is then used for estimating the stronger path in the next iteration. FIGS. 8 and 9 illustrate an example of a second iteration of the iterative reconstruction multipath mitigation algorithm. FIGS. 8 and 9 illustrate the improvements in resolution of the two signals from the composite signal compared to the result after the first iteration (compare, for example, the weaker peak of FIG. 7 to the weaker peak of FIG. 9).

Figure 10:
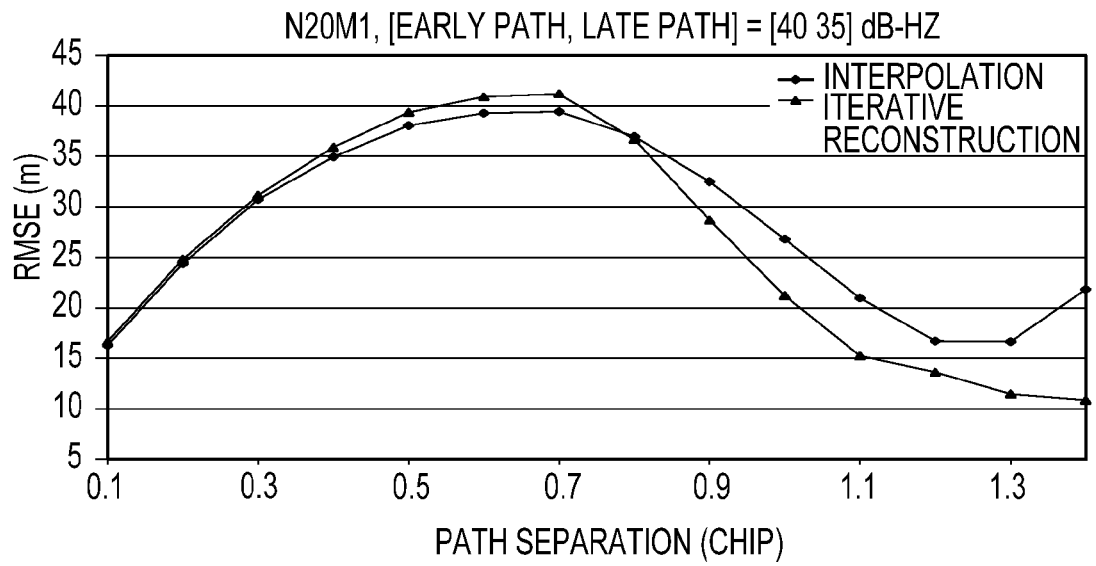
FIGS. 10, 11 and 12 show the performance results of a computer simulation of the iterative reconstruction multipath mitigation algorithm for three different correlation function strength scenarios in terms of the root mean square error (RMSE) in meters vs. multipath separation in chips.
Figure 11:
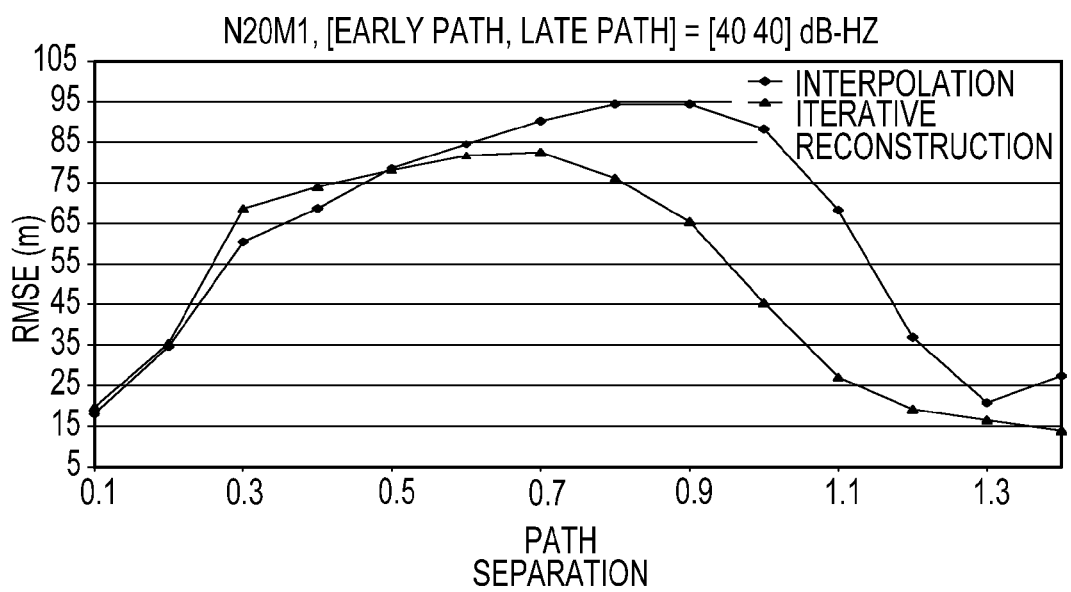
Figure 12:
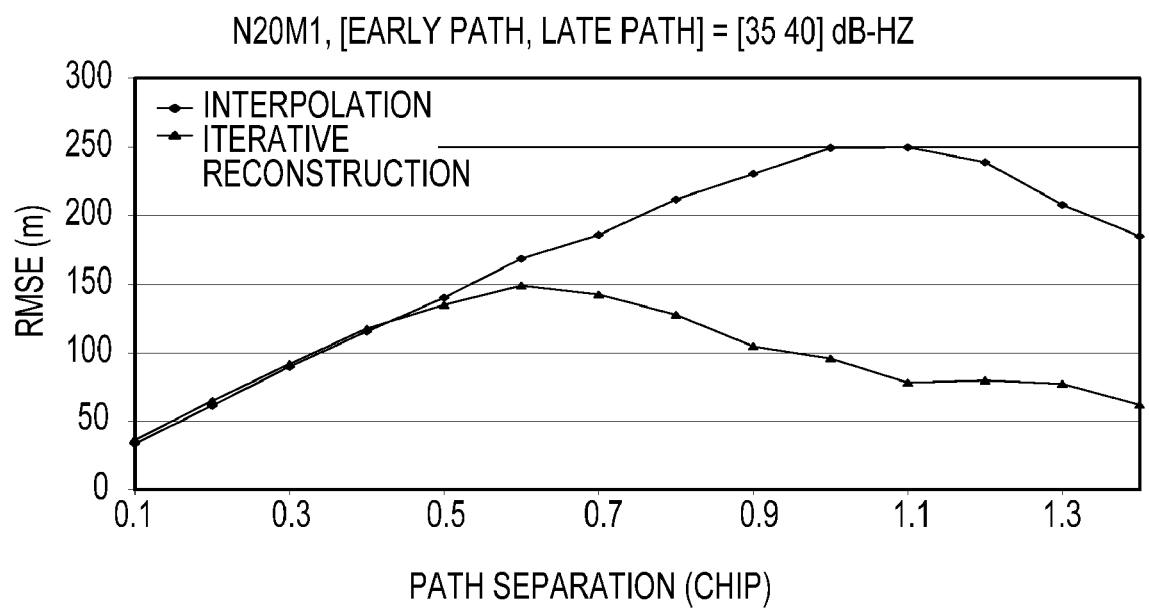

FIGS. 10, 11 and 12 show the performance results of a computer simulation of the iterative reconstruction multipath mitigation algorithm for three different correlation function strength scenarios in terms of the root mean square error (RMSE) in meters vs. multipath separation in chips. In FIG. 10, the early path has a carrier/noise density ratio ($C/N_0$) set to 40 dB-Hz and the late path $C/N_0$ is set to 35 dB-Hz. In FIG. 11, both the early path and the late path have the $C/N_0$ set to 40 dB-Hz. In FIG. 12, the early path $C/N_0$ is set to 35 dB-Hz and the late path $C/N_0$ is set to 40 dB-Hz. All these simulation results indicate that the iterative reconstruction multipath mitigation algorithm yields better performance, i.e. lower RMSE, than the interpolation algorithm for multipath separations of greater than 0.7 chips. For example, the interpolation algorithm has a maximum error of about 250 meters compared to a maximum error of about 150 meters for the iterative reconstruction algorithm.

In general the correlation function r(t) is a two-dimensional function of time delay and Doppler bin (in order to find both code phase offset and Doppler shift for a particular received satellite signal). If the correlation function r(t) is converted into energy units, for example by squaring the amplitude, the two-dimensional correlation function r(t,f) is also referred to as an energy grid. Although this application discusses correlation functions in terms of code phase space, the current techniques apply to two-dimensional correlation functions r(t,f) as well. However, for cases in which the Doppler shift of a later received signal is substantially different from the Doppler shift of the earlier received (usually Line of Sight) signal, the peaks may be easily resolved and short multipath techniques may not be needed. Additionally, short multipath mitigation techniques may be applied only in one dimension since the shape of the correlation function for the different (but close) frequencies is approximately proportional. Finally, computational complexity may make it more efficient to apply the techniques to one dimension rather than two.

In some embodiments, different techniques may be used to characterize the left (earlier) portion of a correlation function peak representation. For example, a generalized Left Edge Likelihood (LEL) function may be defined as:

$$L = \left\{ \frac{rR^{-1}\underline{S}'}{sqrt(\underline{S}R^{-1}\underline{S}')} \right\}$$

In the above, the LEL function L can be used to estimate the similarity of the measured correlation information $r=[r(t_1) \ldots r(t_n)]$ to the ideal single path correlation function $\bar{S}=[s(t_1) \ldots s(t_n)]$, where R denotes the noise covariance. For the s(t), s(0) denotes the ideal correlation function peak, while for r(t), r(0) denotes the measured correlation peak position.

In one embodiment, the information corresponding to the left edge of the peak (e.g., a LEHRI or other left-edge characterization function such as the LEL above) can be used to scale a multipath range correction. For a particular LEHRI value, the ranging error may be estimated as the LEHRI times a proportionality constant.

The various illustrative flow diagrams and logical blocks described herein may be implemented or performed with one or more processors. In one aspect, a processor is coupled with a memory which stores data, meta data, program instructions, etc. to be executed by the processor for implementing or performing the various flow diagrams and logical blocks described herein.

Figure 13:
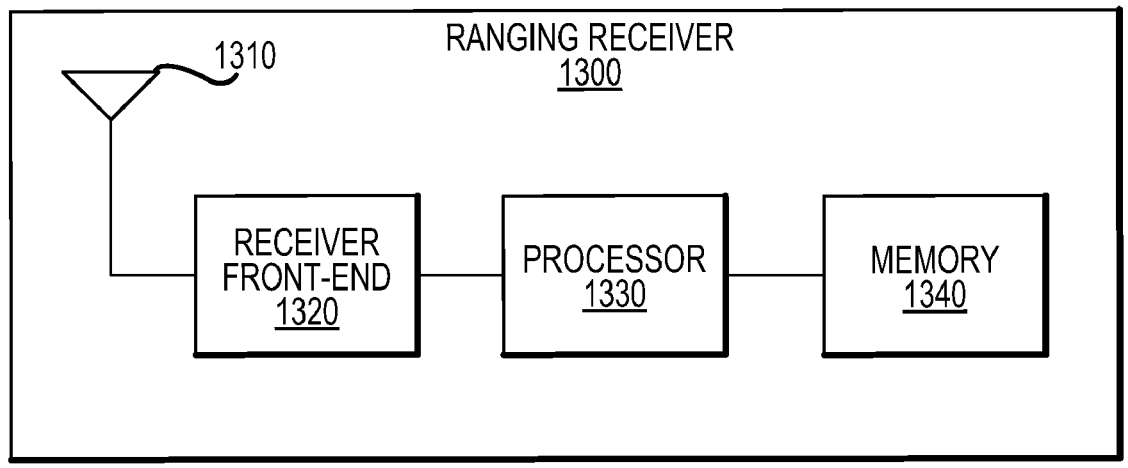
FIG. 13 illustrates a block diagram of an example of a ranging receiver.

FIG. 13 illustrates a block diagram of an example of a ranging receiver 1300. In one aspect, the ranging receiver includes an antenna 1310, a receiver front end 1320, a processor 1330 and a memory 1340. The antenna receives a composite receive RF signal from a plurality of ranging signals from different ranging sources which share the same transmit frequency band. The antenna 1310 sends the composite receive RF signal to the receiver front end 1320. In one aspect, the receiver front end 1320 comprises one or more of a low noise amplifier, bandpass filter, frequency downconverter, AGC amplifier, coherent detector, A/D converter or combinations thereof. One skilled in the art would understand that the components listed are examples and that the receiver front end may include less than the components described, other components not described or combination thereof without affecting the spirit or scope of the present disclosure. In one aspect, the receiver front end 1320 converts the composite receive RF signal into a composite receive digital signal and sends it to the processor 1330. The processor 1330 accepts the composite receive digital signal, performs signal correlation to obtain the correlation function r(t), and processes the correlation function r(t) to obtain the desired signal. The processor 1330 is connected to a memory 1340 for storing of data and algorithms used for processing. In one aspect, memory 1340 stores one of more of the algorithms illustrated in FIGS. 2 and 5 which are processed by processor 1330. In one aspect, the memory 1340 is located within the processor 1330. In another aspect, the memory 1340 is external to the processor 1330.

A processor, for example the processor 1330, may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof. Furthermore, with software, the implementation may be through modules (e.g., procedures, functions, etc.) that perform the functions described therein. The software codes may be stored in memory units and executed by the processor. And, the various illustrative flow diagrams, logical blocks, modules, and/or circuits described herein may also include computer readable medium for storing software.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for multipath mitigation comprising:
   obtaining a shape of a local maximum of a correlation function; computing a Left Edge Height Ratio Indicator (LEHRI) of the shape of the local maximum;
   comparing the LEHRI to a LEHRI threshold ($T_{LEHRI}$) to determine when the weaker path is detected;
   subtracting a first stronger path from a correlation function to obtain a first residual signal, wherein one component of the first residual signal is a weaker path;
   applying reconstruction on the first residual signal to obtain a first reconstructed weaker path;
   subtracting the first reconstructed weaker path from the correlation function to obtain a second residual signal; and
   applying reconstruction on the second residual signal to obtain a second stronger path.

2. The method of claim 1 wherein the correlation function is derived from a ranging source.

3. The method of claim 2 wherein the ranging source is one of a GPS satellite, a pseudolite, or a source using an AFLT technique.

4. The method of claim 1 further comprising:
   subtracting the second stronger path from the correlation function to obtain a third residual signal, wherein one component of the third residual signal is the weaker path;
   applying reconstruction on the third residual signal to obtain a second reconstructed weaker path;
   subtracting the second reconstructed weaker path from the correlation function to obtain a fourth residual signal; and
   applying reconstruction on the fourth residual signal to obtain a third stronger path.

5. The method of claim 4 wherein a desired signal is chosen from either second reconstructed weaker path or the third stronger path.

6. The method of claim 1 wherein the LEHRI is computed by selecting two correlation values at two time indices on the left edge of the shape of the local maximum of the correlation function, and by setting the LEHRI as the ratio of the two correlation values.

7. The method of claim 6 wherein the two time indices are set to −0.8 chips and −0.2 chips.

8. The method of claim 1 further comprising locating a valid peak of the first residual signal, and wherein the step of applying reconstruction on the first residual signal is performed on the valid peak.

9. The method of claim 8 further comprising recovering the first stronger path from the correlation function by applying reconstruction to a local maximum of the correlation function.

10. The method of claim 9 wherein the valid peak is within a predetermined quantity of chips ($T_{chip}$) from the location of the local maximum of the correlation function.

11. The method of claim 10 wherein $T_{chip}$ is 1.5 chips.

12. A method for multipath mitigation comprising:
obtaining a shape of a local maximum of a correlation function;
computing a Left Edge Height Ratio Indicator (LEHRI) of the shape of the local maximum;
comparing the LEHRI to a LEHRI threshold ($T_{LEHRI}$) to determine when a weaker path is detected;
subtracting a first stronger path from the correlation function to obtain a first residual signal, wherein one component of the first residual signal is the weaker path;
locating a valid peak of the first residual signal;
applying reconstruction on the valid peak of the first residual signal to obtain a first reconstructed weaker path;
subtracting the first reconstructed weaker path from the correlation function to obtain a second residual signal; and
applying reconstruction on the second residual signal to obtain a second stronger path.

13. The method of claim 12 further comprising recovering the first stronger path from the correlation function by applying reconstruction to the local maximum of the correlation function.

14. The method of claim 13 wherein a desired signal is chosen from either first reconstructed weaker path or the second stronger path.

15. The method of claim 13 wherein the valid peak is within a predetermined quantity of chips ($T_{chip}$) from the location of the local maximum of the correlation function.

16. The method of claim 15 wherein $T_{chip}$ is 1.5 chips.

17. The method of claim 12 wherein the LEHRI is computed by selecting two correlation values at two time indices on the left edge of the shape of the local maximum in the correlation function, and by setting the LEHRI as the ratio of the two correlation values.

18. The method of claim 17 wherein the two time indices are set to −0.8 chips and −0.2 chips.

19. An apparatus comprising a processor and a memory, the memory containing program code executable by the processor for performing the following:
program code for obtaining a shape of a local maximum of a correlation function;
program code for computing a Left Edge Height Ratio Indicator (LEHRI) of the shape of the local maximum; and
program code for comparing the LEHRI to a LEHRI threshold ($T_{LEHRI}$) to determine when the weaker path is detected;
subtracting a first stronger path from a correlation function to obtain a first residual signal, wherein one component of the first residual signal is a weaker path;
applying reconstruction on the first residual signal to obtain a first reconstructed weaker path;
subtracting the first reconstructed weaker path from the correlation function to obtain a second residual signal; and
applying reconstruction on the second residual signal to obtain a second stronger path.

20. The apparatus of claim 19 wherein the correlation function is derived from a ranging source.

21. The apparatus of claim 20 wherein the ranging source is one of a GPS satellite, a pseudolite, or a source using an AFLT technique.

22. The apparatus of claim 19 wherein a desired signal is chosen from either first reconstructed weaker path or the second stronger path.

23. The apparatus of claim 19 wherein the memory further comprises program code for computing the LEHRI by selecting two correlation values at two time indices on the left edge of the shape of the local maximum of the correlation function, and by setting the LEHRI as the ratio of the two correlation values.

24. The apparatus of claim 19 wherein the memory further comprises program code for locating a valid peak of the first residual signal, and wherein the program code for applying reconstruction on the first residual signal applies reconstruction on the valid peak.

25. The apparatus of claim 24 wherein the memory further comprises program code for recovering the first stronger path from the correlation function by applying reconstruction to a local maximum of the correlation function.

26. The apparatus of claim 25 wherein the valid peak is within 1.5 chips from the location of the local maximum of the correlation function.

27. An apparatus comprising a processor and a memory, the memory containing program code executable by the processor for performing the following:
obtaining a shape of a local maximum of a correlation function;
computing a Left Edge Height Ratio Indicator (LEHRI) of the shape of the local maximum;
comparing the LEHRI to a LEHRI threshold (TLEHR0 to determine when a weaker path is detected;
subtracting a first stronger path from the correlation function to obtain a first residual signal, wherein one component of the first residual signal is the weaker path;
locating a valid peak of the first residual signal;
applying reconstruction on the valid peak of the first residual signal to obtain a first reconstructed weaker path;
subtracting the first reconstructed weaker path from the correlation function to obtain a second residual signal; and
applying reconstruction on the second residual signal to obtain a second stronger path.

28. The apparatus of claim 27 wherein the valid peak is within 1.5 chips from the location of the local maximum of the correlation function.

29. A tangible computer-readable medium including program code stored thereon, comprising:
program code for obtaining a shape of a local maximum of a correlation function;
program code for computing a Left Edge Height Ratio Indicator (LEHRI) of the shape of the local maximum; and
program code for comparing the LEHRI to a LEHRI threshold ($T_{LEHRI}$) to determine when the weaker path is detected;
program code for subtracting a first stronger path from the correlation function to obtain a first residual signal, wherein one component of the first residual signal is a weaker path;
program code for applying reconstruction on the first residual signal to obtain a first reconstructed weaker path;

program code for subtracting the first reconstructed weaker path from the correlation function to obtain a second residual signal; and program code for applying reconstruction on the second residual signal to obtain a second stronger path.

30. The tangible computer-readable medium of claim 29 further comprising program code for computing the LEHRI by selecting two correlation values at two time indices on the left edge of the shape of the local maximum of the correlation function, and by setting the LEHRI as the ratio of the two correlation values.

31. The tangible computer-readable medium of claim 30 further comprising program code for locating a valid peak of the first residual signal, and wherein the program code for applying reconstruction on the first residual signal applies reconstruction on the valid peak.

32. The tangible computer-readable medium of claim 31 wherein the valid peak is within 1.5 chips from the location of the local maximum of the correlation function.

33. A tangible computer-readable medium including program code stored thereon, comprising:
   program code for obtaining a shape of a local maximum of a correlation function;
   program code for computing a Left Edge Height Ratio Indicator (LEHRI) of the shape of the local maximum;
   program code for comparing the LEHRI to a LEHRI threshold ($T_{LEHRI}$) to determine when a weaker path is detected;
   program code for subtracting a first stronger path from the correlation function to obtain a first residual signal, wherein one component of the first residual signal is the weaker path;
   program code for locating a valid peak of the first residual signal;
   program code for applying reconstruction on the valid peak of the first residual signal to obtain a first reconstructed weaker path;
   program code for subtracting the first reconstructed weaker path from the correlation function to obtain a second residual signal; and
   program code for applying reconstruction on the second residual signal to obtain a second stronger path.

34. The computer-readable medium of claim 33 wherein the valid peak is within 1.5 chips from the location of the local maximum of the correlation function.

35. A method for multipath identification comprising:
   obtaining a shape of a local maximum of a correlation function;
   computing a Left Edge Height Ratio Indicator (LEHRI) of the shape of the local maximum;
   comparing the LEHRI to a LEHRI threshold ($T_{LEHRI}$) to determine when a weaker path is detected;
   subtracting a first stronger path from the correlation function to obtain a first residual signal, wherein one component of the first residual signal is the weaker path;
   locating a valid peak of the first residual signal;
   applying reconstruction on the valid peak of the first residual signal to obtain a first reconstructed weaker path;
   subtracting the first reconstructed weaker path from the correlation function to obtain a second residual signal; and
   applying reconstruction on the second residual signal to obtain a second stronger path.

36. An apparatus comprising a processor and a memory, the memory containing program code executable by the processor for performing the following:
   program code for obtaining a shape of a local maximum of a correlation function;
   program code for computing a Left Edge Height Ratio Indicator (LEHRI) of the shape of the local maximum; and
   program code for comparing the LEHRI to a LEHRI threshold ($T_{LEHRI}$) to determine when the weaker path is detected;
   program code for subtracting a first stronger path from the correlation function to obtain a first residual signal, wherein one component of the first residual signal is the weaker path;
   program code for locating a valid peak of the first residual signal;
   program code for applying reconstruction on the valid peak of the first residual signal to obtain a first reconstructed weaker path;
   program code for subtracting the first reconstructed weaker path from the correlation function to obtain a second residual signal; and
   program code for applying reconstruction on the second residual signal to obtain a second stronger path.

37. A tangible computer-readable medium including program code stored thereon, comprising:
   program code for obtaining a shape of a local maximum of a correlation function;
   program code for computing a Left Edge Height Ratio Indicator (LEHRI) of the shape of the local maximum; and
   program code for comparing the LEHRI to a LEHRI threshold ($T_{LEHRI}$) to determine when a weaker path is detected;
   program code for subtracting a first stronger path from the correlation function to obtain a first residual signal, wherein one component of the first residual signal is the weaker path;
   program code for locating a valid peak of the first residual signal;
   program code for applying reconstruction on the valid peak of the first residual signal to obtain a first reconstructed weaker path;
   program code for subtracting the first reconstructed weaker path from the correlation function to obtain a second residual signal; and
   program code for applying reconstruction on the second residual signal to obtain a second stronger path.

* * * * *